(12) United States Patent  
Naukkarinen et al.

(10) Patent No.: US 8,401,571 B2
(45) Date of Patent: Mar. 19, 2013

(54) MOBILE ELECTRONIC SYSTEM

(75) Inventors: Santtu Naukkarinen, Espoo (FI); Tapani Ryhänen, Helsinki (FI); Kari Hjelt, Espoo (FI); Kai Inha, Järvenpää (FI)

(73) Assignee: Sulvanuss Capital L.L.C., Wilmington, DE (US)

( * ) Notice: Subject to any disclaimer, the term of this patent is extended or adjusted under 35 U.S.C. 154(b) by 2168 days.

(21) Appl. No.: 10/534,012

(22) PCT Filed: Nov. 5, 2002

(86) PCT No.: PCT/IB02/04630
§ 371 (c)(1), (2), (4) Date: May 5, 2005

(87) PCT Pub. No.: WO2004/042322
PCT Pub. Date: May 21, 2004

(65) Prior Publication Data
US 2006/0052132 A1  Mar. 9, 2006

(51) Int. Cl.
*H04W 24/00* (2009.01)
(52) U.S. Cl. ..................... 455/457; 455/456.1
(58) Field of Classification Search .......... 701/220, 701/224; 342/357.01, 9, 357.1; 702/150, 702/33, 220, 224; 455/456.1, 404.2, 414.2, 455/440, 457
See application file for complete search history.

(56) References Cited

U.S. PATENT DOCUMENTS

| | | | |
|---|---|---|---|
| 4,729,172 A | 3/1988 | Alberter et al. | |
| 6,111,525 A | 8/2000 | Berlioz | |
| 6,363,250 B1 | 3/2002 | Lindell | |
| 2002/0056202 A1 | 5/2002 | Tamura | |
| 2002/0100178 A1 | 8/2002 | Morton et al. | |
| 2002/0140745 A1* | 10/2002 | Ellenby et al. | 345/848 |
| 2003/0135327 A1* | 7/2003 | Levine et al. | 701/220 |

FOREIGN PATENT DOCUMENTS

| | | |
|---|---|---|
| CN | 1372127 | 10/2002 |
| DE | 19837568 | 6/1999 |
| GB | 2298539 | 9/1996 |
| GB | 2358515 | 7/2001 |
| JP | 11344339 | 12/1999 |
| JP | 2002 168629 | 6/2002 |
| WO | WO 01/88687 | 11/2001 |
| WO | WO 0209396 | 1/2002 |

OTHER PUBLICATIONS

US patent application publication 2002/0116125 as translation for CN 1372127 (CN 1372127 is claiming priority from US 2002/0116125), Aug. 22, 2002.

* cited by examiner

*Primary Examiner* — Tu X Nguyen
(74) *Attorney, Agent, or Firm* — Stolowitz Ford Cowger LLP

(57) ABSTRACT

The invention relates to a mobile electronic system. In order to expand and enhance the usability of the mobile electronic system, it is proposed that it comprises a 3D magnetometer 51 performing magnetic measurements in three dimensions and providing data indicative of the current posture of the mobile electronic system based on these measurements. Further, it is proposed that the mobile electronic system comprises processing means 52, 54 processing the data provided by the 3D magnetometer 51 for enabling a posture related presentation of information via output means 12, 42 of the mobile electronic system. The invention relates equally to components of such a system and to a corresponding method.

25 Claims, 4 Drawing Sheets a)

b)

c)

d)

MOBILE ELECTRONIC SYSTEM

CROSS REFERENCE TO RELATED APPLICATIONS

This application is for entry into the U.S. national phase under §371 for International Application No. PCT/IB02/004630 having an international filing date of Nov. 5, 2002, and from which priority is claimed under all applicable sections of Title 35 of the United States Code including, but not limited to, Sections 120, 363 and 365(c).

FIELD OF THE INVENTION

The invention relates to a mobile electronic system comprising means which realize the function of a compass and to components of such a system. The invention relates equally to a method for a mobile electronic system.

BACKGROUND OF THE INVENTION

It is known from the state of the art to provide mobile electronic systems with a two dimensional compass. Such a mobile electronic system may be included for instance in a communication device like a mobile phone.

In German patent application DE 198 37 568 A1, it is proposed to provide a Personal Digital Assistant (PDA) with a Global Positioning System (GPS) receiver, a mobile communication unit and a compass. The compass is used for determining the current orientation of the PDA, which is required for realizing navigation functions in the PDA.

In British patent application GB 2 298 539 A, it is equally proposed to provide a hand held device containing a GPS receiver with a compass. A displayed information relating to the current environment, e.g. a map, is rotated in accordance with the respective orientation of the device.

Further, it is proposed in international application WO 01/88687 A2 to access context information with a user equipment, e.g. a mobile phone. The context information is downloaded from a network based on a location service. Then, the orientation of the user equipment is determined using a compass in the user equipment. Once the orientation is known, a visual user interface is generated at the user equipment for displaying the downloaded context information. In order to select a virtual object displayed in the visual user interface, the user can point to the respective object by orienting the user equipment. During the movement of the user equipment, the displayed virtual objects move accordingly in front of the user.

A mobile electronic system may also comprise an Inertial Navigation Systems (INS), which INS can be used for determining the position of the mobile electronic system. In such a system, it is essential that provided heading information remains accurate along time, since even small errors in the computed orientation cause significant errors to the position estimate. Traditionally, IN Systems utilize gyro-compasses to ensure an accurate heading. Gyro-compasses, however, have several disadvantages. They constitute quite expensive components due to their complicated electronics. Moreover, they are physically large sensors and can thus not be implemented in small modules. The use of a conventional 3-axis gyro-compass in a small INS is not feasible at all, since it requires even more complex electronics and its power consumption is much higher. As a result, it is more expensive and it also requires more space. A 3-axis operation, however, is essential for an accurate INS.

SUMMARY OF THE INVENTION

It is an object of the invention to expand and enhance the usability of a mobile electronic system.

This object is reached according to the invention with a mobile electronic system, which comprises output means enabling a presentation of information to a user of the mobile electronic system. The proposed mobile electronic system further comprises a 3D (three-dimensional) magnetometer performing magnetic measurements in three dimensions and providing data indicative of the current posture of the mobile electronic system based on these measurements. The 3D magnetometer thus realizes the functions of a 3-dimensional compass. Finally, the proposed mobile electronic system comprises processing means processing the data provided by the 3D magnetometer for enabling a posture related presentation of information via the output means.

The mobile electronic system may be a single unit or be composed of several units. It may be comprised, for example, completely in a user equipment like a mobile communication device. Alternatively, the mobile electronic system may comprise for example a user equipment including the output means, while at least the 3D magnetometer is included in a separate, complementary unit which can be connected to the user equipment. In the latter case, the connection should be rigid so that the posture of the complementary unit with the 3D magnetometer corresponds always to the posture of the user equipment. The processing means can then be included in either of the two units or be distributed to the two units. The unit comprising the output means may be for example a mobile phone and the complementary unit comprising the 3D magnetometer a functional cover for the mobile phone.

The object of the invention is equally reached with a corresponding complementary unit and with a corresponding user equipment comprising either the part of the proposed mobile electronic system not comprised by a complementary unit or the entire proposed mobile electronic system.

The object of the invention is further reached with a corresponding method for a mobile electronic system. The method comprises in a first step performing magnetic measurements in three dimensions in the mobile electronic system. The method comprises moreover determining data indicative of the current posture of the mobile electronic system based on the performed magnetic measurements. Finally, the proposed method comprises processing this data for enabling a posture related presentation of information to a user of the mobile electronic system.

The invention is based on the consideration that a 3D magnetometer is able to sense not only the orientation of a device in which it is included or to which it is attached in a horizontal plane, like a 2D compass, but also its current inclination. This additional data can be employed for a variety of new or enhanced functions of a mobile electronic system. It can be used for example to enhance the presentation of information and/or to select a mode of presentation depending on the current posture of the mobile electronic device. A 3D magnetometer can further be used as main source for heading information in an inertial navigation system, since it is smaller and less expensive than a gyro-compass.

Preferred embodiments of the invention become apparent from the dependent claims.

In a preferred embodiment of the invention, the presented information comprises compass information.

In another preferred embodiment of the invention, different modes of presentation are selected depending on the posture of the mobile electronic system. In case the output means comprise a display and the mobile electronic system is held basically horizontally, the display and functioning can resemble e.g. to a traditional compass. When the mobile electronic system is held basically vertically, in contrast, the presentation of information may be switched to some other mode.

In another preferred embodiment of the invention, the output means comprise a 3D display for a presentation of compass information, e.g. a presentation of a floating compass. This enables a new user experience compared to a 2D electrical compass, which cannot even be used in free posture.

In another preferred embodiment of the invention, the system comprises additional sensor means, which provide further measurement data. These further measurement data can be employed by the processing means in addition for enabling the posture related presentation of information via the output means. The additional measurement data allow the processing means to adjust the functionality of the system to the environment and/or to a user profile. For example, data on the posture and the characteristics of the movements of the mobile electronic system can be used to change the functionality. The adjustment of the functionality may comprise for example an adjustment of the presentation of information via the output means and/or an adjustment of a filtering of signals provided by the 3D magnetometer.

The additional sensor means may comprise for example a 2D or 3D linear accelerometer measuring the acceleration of the mobile electronic system in two or three dimensions, respectively, or a 3D angular accelerometer measuring the angular acceleration of the mobile electronic system in three dimensions.

Since a magnetic compass is subjected to unpredictable disturbances, a 3D angular accelerometer can be used to verify whether sudden changes of direction indicated by the 3D magnetometer actually occurred or whether there was only a temporary disruption. This enables a compensation of random magnetic disturbances. From an implementation point of view, angular accelerometers have the advantage that they do not require any dedicated electronics and that they can be read with the same electronics as linear accelerometers. Angular accelerometers are also inexpensive and smaller than gyro-compasses.

In case a 3D angular accelerometer is used as additional sensor means, the 3D magnetometer may provide first data indicating a current heading of the mobile electronic system, while the 3D angular accelerometer provides second data indicating a current heading of the mobile electronic system. Moreover, the processing means may comprise a complementary filter combining the first and second data, in order to obtain a particularly reliable information on the current heading of the mobile electronic system.

A combination of a 3D magnetometer and a 3D angular accelerometer is of particular advantage for an INS realized in the mobile electronic system.

It is understood that data provided by the 3D magnetometer may be used for various applications in the mobile electronic system.

BRIEF DESCRIPTION OF THE FIGURES

Other objects and features of the present invention will become apparent from the following detailed description considered in conjunction with the accompanying drawings, wherein.

DETAILED DESCRIPTION OF THE INVENTION

Figure 1:
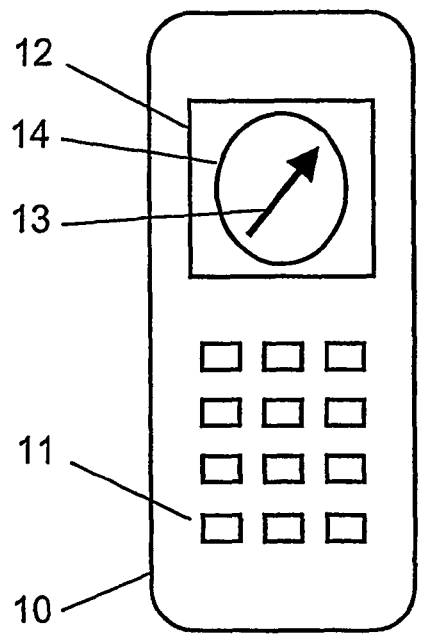
FIG. 1 schematically illustrates a first posture dependent display mode employed in a first embodiment of the invention.
Figure 2:
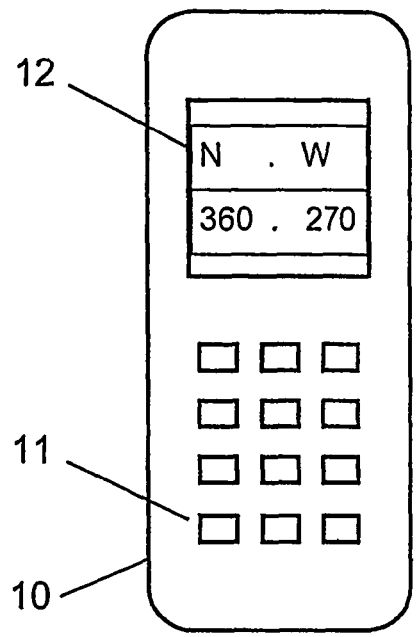
FIG. 2 schematically illustrate a second posture dependent display mode employed as first example in the first embodiment of the invention.
Figure 3:
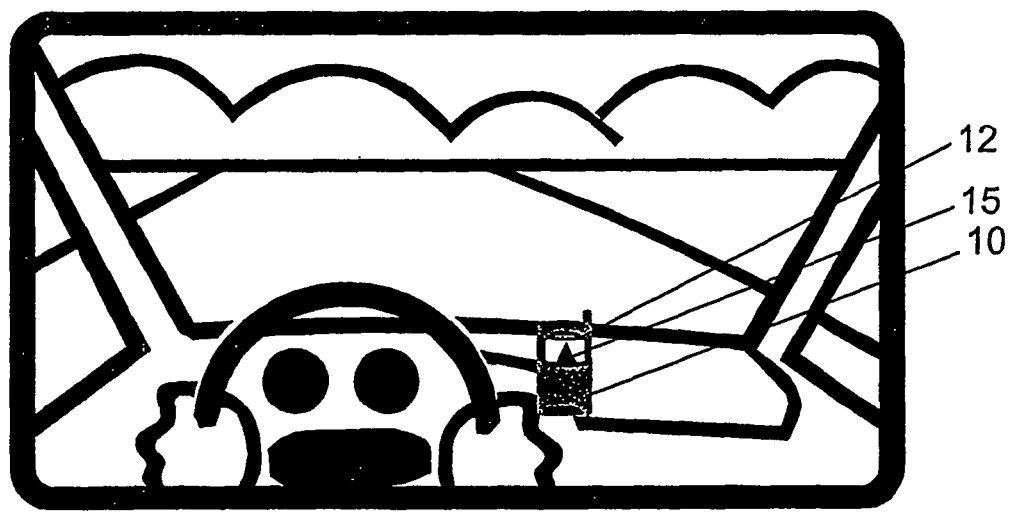
FIG. 3 schematically illustrate a second posture dependent display mode employed as second example in the first embodiment of the invention.

In a first embodiment of the invention illustrated in FIGS. 1 to 3, a mobile phone 10 can be employed as a two-dimensional compass with two different presentation modes. The mobile phone 10 comprises buttons 11, a display 12, a 3D magnetometer, a 3D accelerometer and processing means.

The 3D magnetometer constantly performs magnetic measurements in all three dimensions. The measurement results, which constitute an information on the current posture of the mobile phone 10, are provided to the processing means. Moreover, the 3D accelerometer constantly performs acceleration measurements in all three dimensions. Also these measurement results, which allow one to draw conclusions as to the current velocity of the mobile phone, are provided to the processing means.

As long as the measurement results by the 3D accelerometer indicate that the mobile phone is only moved slowly, a fast acting filtering software is activated in the processing means for filtering the measurement results provided by the 3D magnetometer. The fast acting filtering software filters the measurement results with an integration period of about 1 to 3 seconds, which removes e.g. the influence of hand vibrations, of by-passing cars and of disturbances in the magnetic fields of the earth.

In case the measurement results by the 3D accelerometer indicate, in contrast, that the mobile phone is moved with an increased velocity, a slow filtering software is activated in the processing means for filtering the measurement results provided by the 3D magnetometer. The slow filtering software filters the measurement results with an integration period of about 5 to 10 seconds. The slow filtering is activated for instance in case the compass function is to be used while the user is driving in an urban city environment, in order to filter temporary fluctuations in the magnetic field due to bypassing trams, buses, buildings, metal constructions, etc.

The filtered measurement results of the 3D magnetometer are then evaluated by the processing means for presenting compass information on the display 12 of the mobile phone 10.

When the magnetic measurements indicate that the phone 10 is positioned basically horizontally, which may e.g. be the case when a user of the phone 10 is walking, a first mode of presentation is selected by the processing means. In the first mode of presentation, the display 12 and the functioning resembles a traditional compass.

For this first mode of presentation, the processing means determine the direction in the horizontal plane to which the top of the mobile phone 10 is oriented based on the provided measurement results. The orientation information contained in the filtered signal is then reflected by an arrow 13 in a circle 14 on the display 12 of the mobile phone 10, as shown in FIG. 1. The circle 14 with the arrow 13 represent a conventional compass. Accordingly, the arrow 13 is always oriented such that it points to the North. Alternatively, any other predetermined direction could be indicated based on the filtered signals. The fast acting filtering, which is activated when the user is walking, allows the user to find North without unnecessary delays.

When the magnetic measurements indicate, in contrast, that the degree of an inclination of the mobile phone exceeds a predetermined value, which may e.g. be the case when a person is tilting the phone or when it is kept in a car stand, a second mode of presentation is selected.

For the second mode of presentation, the processing means determine the orientation of the back of the tilted mobile phone based on the filtered magnetic measurement results. The presentation of the determined compass information differs moreover from the presentation in the first mode of presentation, since a simulation of a conventional compass as in the first mode of presentation is not appropriate with a tilted phone.

Two possibilities for the second mode of presentation are illustrated in FIGS. 2 and 3.

In the first possibility illustrated in FIG. 2, the presentation on the display 12 resembles a "marine compass". In a first row, the current orientation of the phone is indicated by the points of the compass North "N", East "E", South "S" and West "W", while in a second row, the current orientation of the phone is indicated by corresponding degrees "90", "180", "270" and "360". In the situation depicted in FIG. 2, the user of the phone faces North-West or 315°, since the center of the first row lies between an indicated "N" and an indicated "W", and the center of the second row lies between indicated "360" and "270" degrees.

The second possibility for the second mode of presentation illustrated in FIG. 3 is provided in order to enable a user of a mobile phone 10 to easily keep a preset target direction. The direction may be entered via the buttons 11 of the mobile phone 10. The desired direction can be selected in particular using the points of the compass or a corresponding indication in degrees.

The direction information contained in the filtered magnetic measurement results is then reflected by a simple arrow pointing in the desired direction on the display.

FIG. 3 presents the view of a driver of a car who is using the mobile phone 10 with the second possibility for the second mode of presentation. The mobile phone 10 is fixed in a car stand, which is connected to the dashboard on the right hand side of the steering wheel of the car. In the presented example, the arrow 15 shown on the display 12 of the mobile phone 10 indicates that the desired direction is straight ahead.

With the second possibility for the second mode of presentation, thus a simplified navigation system is provided. It may be used for example when driving in an urban environment towards an airport, which is lying in a known direction. The slow filtering, which is activated when the user is driving, ensures that most magnetic disturbances are not visible in the presentation of the compass information.

In a second embodiment of the invention, a mobile phone can be employed for simulating a floating three-dimensional compass, e.g. a floating navy compass. Like the mobile phone of the first embodiment, the mobile phone of the second embodiment comprises buttons, a display, a 3D magnetometer, a 3D accelerometer and processing means. In the second embodiment, however, the display is a 3D display.

The 3D magnetometer constantly performs magnetic measurements in all three dimensions, which provide an information on the current posture of the mobile phone. The 3D accelerometer further measures the accelerations of the mobile phone in all three dimensions.

The measurement results of the 3D magnetometer and the 3D accelerometer are used by the processing means for presenting the floating compass on the display of the mobile phone. More specifically, the measurement results provided by the 3D accelerometer are used by the processing means for filtering the measurement results provided by the 3D magnetometer with a delay, similarly as described for the first embodiment. Then, the processing means show a 3D compass on the 3D display, of which the orientation corresponds to the posture information contained in the filtered measurement results. The compass is represented by the processing means on the 3D display such that a user can view the compass from all sides by tilting the mobile phone. Due to the filtering of the signals, the displayed compass follows changes of the posture only slowly, resulting in the particular effect of a virtual floating compass.

FIGS. 4a-4d schematically illustrate the presentation of the floating compass on the display 42 of the mobile phone for various postures of the phone.

The compass is represented as a sphere 43 on the 3D display 42 of the mobile phone. The top of the sphere 43, and thus of the virtual compass, is indicated by circles 44. In all four cases illustrated in FIGS. 4a-4d, the user of the mobile phone is facing South-East (SE). An arrow 45 indicating the direction which the user faces is thus labeled "SE". The arrow 45 is always pointing to the top 44 of the sphere 43. A circle 46 is depicted around the middle of the sphere 43, all points of the circle being equidistant to the top 44 of the sphere 43.

Figure 4:
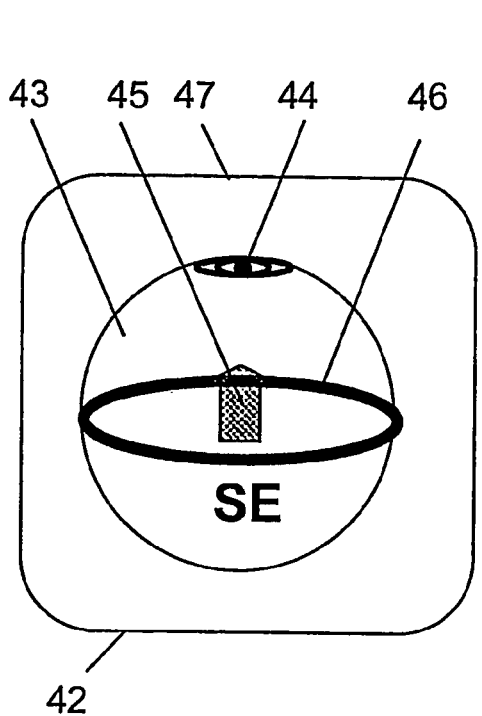
FIG. 4a-d schematically illustrate a simulation of a floating compass in a second embodiment of the invention.
Figure 4:
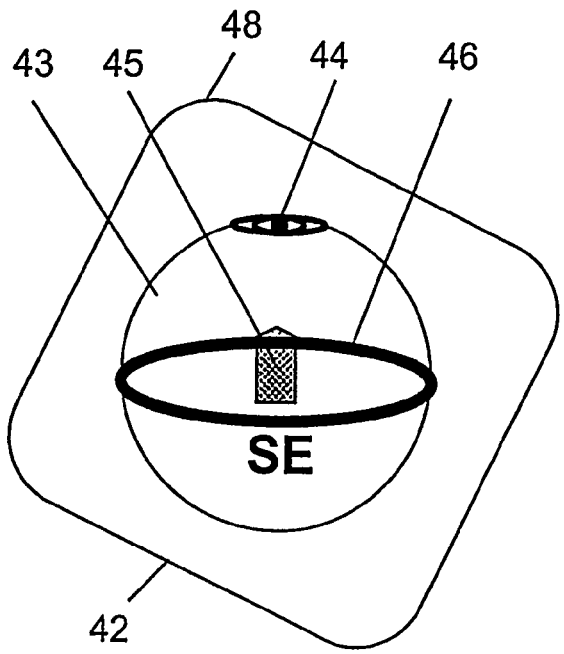
Figure 4:
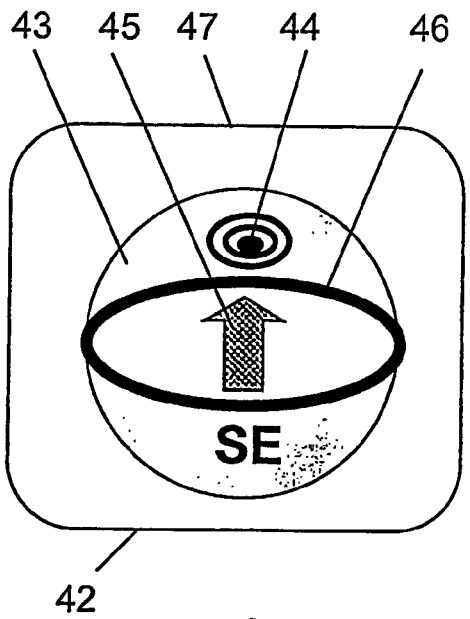
Figure 4:
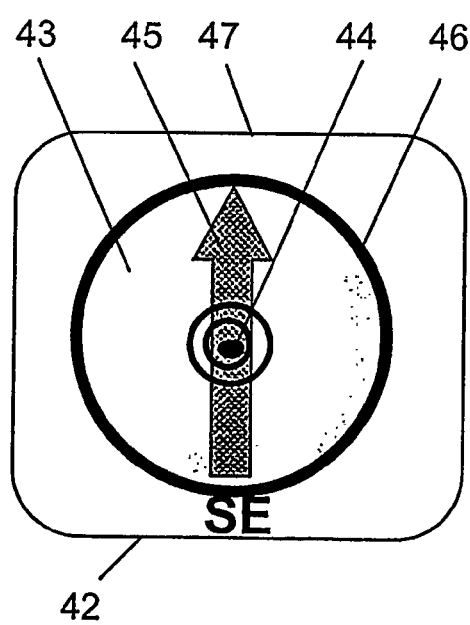

FIG. 4a shows the display 42 in a first situation, in which the mobile phone is hold vertically. The top 44 of the compass is depicted next to the top 47 of the display 42. The arrow 45 indicating South-East is rather short in the first situation.

FIG. 4b shows the display 42 in a second situation in which, proceeding from the first situation in FIG. 4a, the mobile phone is tilted sideways to the right. The user has exactly the same view on the represented compass as in FIG. 4a. That is, the top 44 of the compass is now depicted next to the upper left corner 48 of the display 42. The arrow 45 indicating South-East has the same length as in FIG. 4a.

FIG. 4c shows the display 42 in a third situation, in which, proceeding from the first situation in FIG. 4a, the mobile phone is tilted forward. As a result, the bottom of the mobile phone is now somewhat closer to the user than the top of the mobile phone. The represented compass appears to be rotated towards the user, since the top 44 of the compass is shifted in direction of the center of the display 42. The arrow 45 indicating South-East is slightly longer than in FIGS. 4a and 4b.

FIG. 4d shows the display 42 in a fourth situation, in which the mobile phone is hold horizontally. The user of the mobile phone has now a top view on the represented compass. Thus, the top 44 of the compass is depicted in the center of the visible part of the sphere 43. The arrow 45 indicating South-East extends throughout the visible part of the sphere 43. The visible part of the sphere 43 is now limited by the circle 46 depicted around the middle of the sphere 43.

The second embodiment of the invention is ideal for mobile phones having a large color display.

In a third embodiment of the invention, a mobile phone is employed for realizing an INS. To this end, the mobile phone comprises a display, a 3D magnetometer, a 3-axis angular accelerometer and processing means.

Measurement results provided by the 3D magnetometer and the angular accelerometer are used by the processing means for presenting the current heading of the user of the mobile phone on the display. The 3D magnetometer provides an excellent long term reference for the angular position of the device. However, magnetometers are sensitive to external disturbances. The angular accelerometer on the contrary presents low noise operation but poor stability. Thus, the combination of the magnetometer and the angular accelerometer provides means to perform a measurement with good stability and good tolerance to external disturbances.

Figure 5:
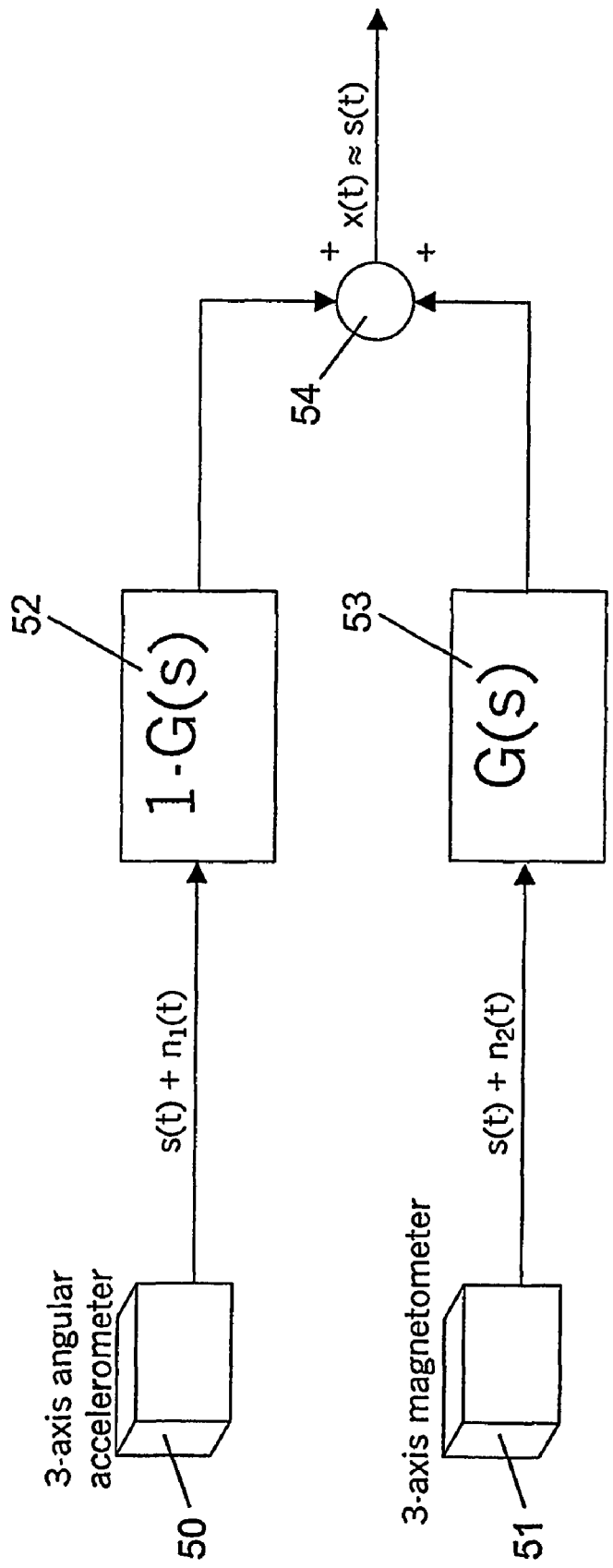
FIG. 5 is a block diagram of a complementary filter employed in a third embodiment of the invention.

FIG. 5 is a block diagram which illustrates the processing of the signals provided by the 3D magnetometer and the angular accelerometer. The block diagram comprises a first block 50 representing the 3-axis angular accelerometer and a second block 51 representing the 3D magnetometer. The output of the angular accelerometer 50 is connected to first filter means 52 and the output of the 3D magnetometer 51 is connected to second filter means 53. The outputs of the filter means 52, 53 are connected to a summing point 54. The filter means 52, 53 and the summing point 54, which form a complementary filter, are part of the processing means of the mobile phone.

The angular accelerometer 50 measures angular accelerations of the mobile phone in any direction proceeding from a point of time at which the heading was known until a new point of time t. Based on the measured movements and on the last known heading, the angular accelerometer then estimates the new heading at point of time t and provides a corresponding first heading signal. This first heading signal comprises the true heading s(t) at point of time t and a noise component $n_1(t)$, which takes account of errors in the angular measurements.

At the same point of time t, the 3D magnetometer 51 performs in addition magnetic measurements, in order to determine the current posture of the mobile phone. Based on the magnetic measurements, the 3D magnetometer 51 then estimates as well the new heading of the mobile phone at point of time t and provides a corresponding second heading signal. This second heading signal comprises equally the true heading s(t) at point of time t and a noise component $n_2(t)$, which takes account of errors in the magnetic measurements.

As a result, two redundant measurements of the same signal are available. These two measurements can now be combined in a way that the measurement error is minimized. This is achieved with the complementary filter, to which the two heading signals are provided.

The first heading signal is subjected by the first filter means 52 to a filtering function which has a transfer function G(s). Moreover, the result of the function G(s) is subtracted from 1. The second heading signal is only subjected by the second filter means 53 to a filtering with a transfer function G(s). The output of the filter means 52, 53 is then summed at the summing point 54, resulting in the sum x(t). Such a complementary filtering allows to filter the noise without distorting the signal.

The signal output by the summing point 54 thus reflects very closely the true heading of the mobile phone at point of time t, and a corresponding information can be presented on the display of the mobile phone.

Figure 6:
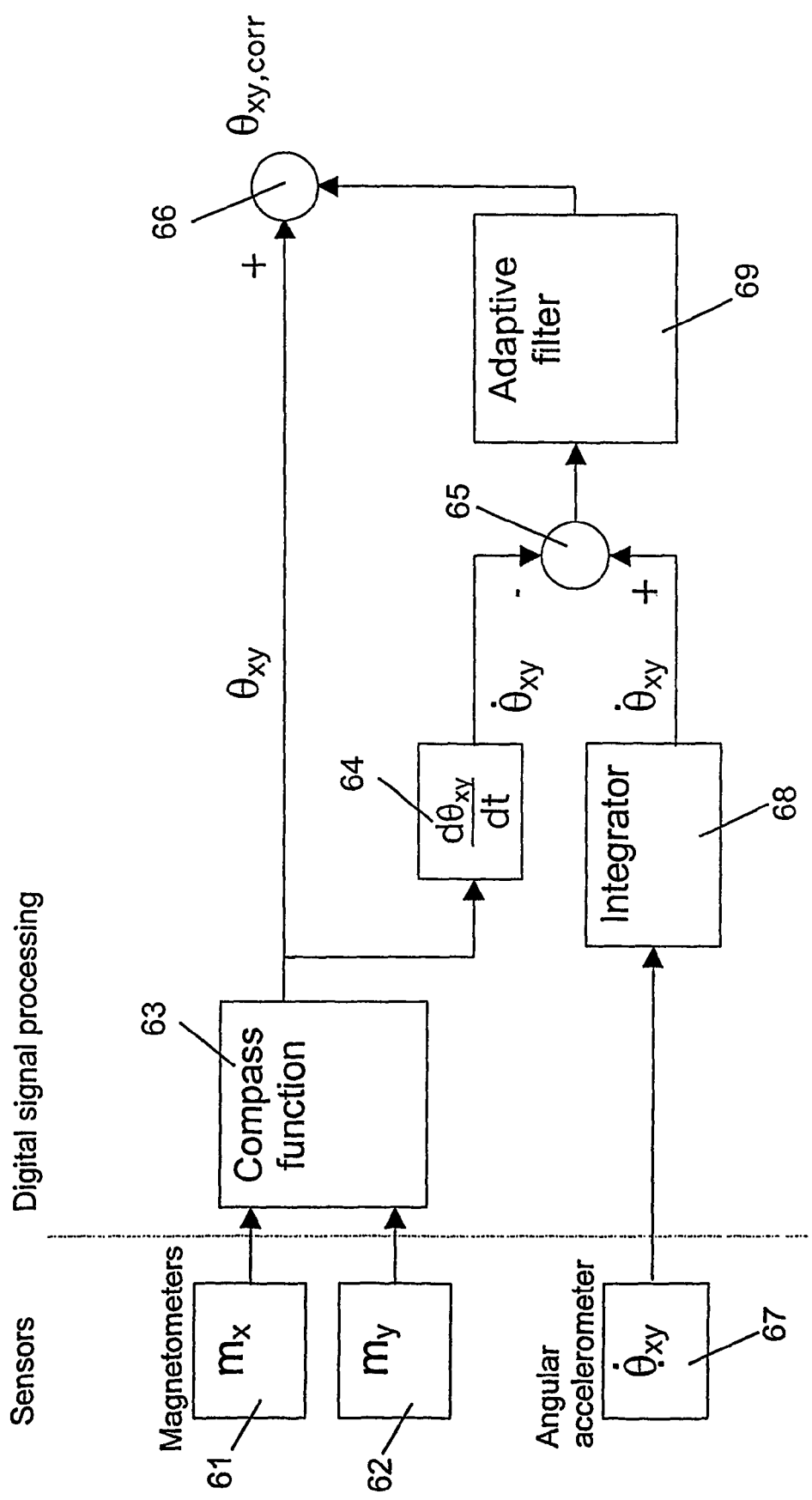
FIG. 6 is a block diagram of a complementary filter in one compass plane that is based on two axis of a magnetometer and on an angular accelerometer.

FIG. 6 presents a more concrete implementation of a complementary filtering based on the use of an angular accelerometer for compensating magnetic field disturbances in the signals of a magnetometer. FIG. 6 is more specifically a block diagram of a complementary filter for one compass plane that is based on a two axis magnetometer and an angular accelerometer. A similar implementation is required for all three directions.

The block diagram of FIG. 6 comprises two blocks 61, 62 representing measurement values $m_x$, $m_y$ of a 3D magnetometer in a first direction x and a second direction y, respectively.

The two blocks 61, 62 are connected to a block 63 representing compass functions. The output of this block 63 is connected on the one hand via a block representing a derivator 64 to a first summing point 65 and on the other hand to a second summing point 66. The block diagram moreover comprises a block 67 representing measurement values $\dot{\theta}_{xy}$ of an angular accelerometer. This block 67 is connected to an integrator 68 and further to the first summing point 65. The output of the first summing point 65 is connected to a block representing an adaptive filter 69. The output of block 69 is connected as well to the second summing point 66. A dashed line separates the sensor related blocks 61, 62 and 67 on the left hand side from the other, digital signal processing related blocks on the right hand side.

The compass signal $\theta_{xy}$ that is calculated in block 63 from the magnetometer values $m_x$, $m_y$ is differentiated in the derivator 64 with respect to time in order to remove the constant field value. The resulting value indicates the angular velocity based on the magnetic field, but includes high frequency disturbances. The corresponding angular acceleration signal $\dot{\theta}_{xy}$ is integrated in the integrator 68. The resulting value indicates the true angular velocity based on the acceleration of the mobile phone, but comprises a low frequency drift. The time constants of derivator 64 and integrator 68 are matched.

The two signals $\dot{\theta}_{xy}$ output by the derivator 64 and the integrator 68 are compared by means of the summing point 65 in order to separate the disturbances and the low frequency drift of the true angular velocity. The summing point 65 subtracts more specifically the value obtained from the derivator 64 from the value obtained from the integrator 68. The signal is then passed through the adaptive filter 65. The adaptive filter applies a high-pass filtering on the received signal in order to separate the disturbances of the signal. The disturbances are further integrated in the adaptive filter 65 in order to obtain an estimate of the angular error of the device for the inertial navigation purposes.

The high-pass filtered estimate of the angular error is then subtracted by the second summing point 66 from the compass heading information $\theta_{xy}$ including disturbances, which is output by block 63. The output of the second summing point 66 is thus a corrected compass heading $\theta_{xy,corr}$ for one compass plane.

The system of FIG. 6 can be further improved by using adaptive filters, such as Kalman filters, for the error signal processing.

It is to be noted that the described embodiments constitute only selected ones of a variety of possible embodiments of the invention.

The invention claimed is:

1. An apparatus comprising
at least one processing component configured to process data indicative of the current posture of said apparatus for enabling a posture related presentation of information to a user via an output component, said processing including selecting one of at least two different modes of presentation depending on said current posture of said apparatus.

2. The apparatus according to claim 1, wherein said at least one processing component is configured to present compass information via said output component based on said data.

3. The apparatus according to claim 2, further comprising said output component, wherein said output component comprise a 3D display for presenting said compass information.

4. The apparatus according to claim 3, wherein said at least one processing component is configured to present a floating compass on said 3D display based on said data.

5. The apparatus according to claim 1, wherein said at least one processing component is configured to receive said data indicative of the current posture of said apparatus from a 3D magnetometer and wherein said at least one processing component is configured to use additional measurement data provided by at least one additional sensor for enabling a posture related presentation of information via said output component.

6. The apparatus according to claim 5, wherein said at least one processing component is configured to use said additional measurement data provided by said at least one additional sensor at least for one of the following: adjusting a presentation of information via said output component and filtering signals provided by said 3D magnetometer.

7. The apparatus according to claim 5, further comprising said at least one additional sensor, wherein said at least one additional sensor comprises a 2D or 3D linear accelerometer configured to measure the acceleration of said mobile electronic system in three dimensions.

8. The apparatus according to claim 5, further comprising said at least one additional sensor, wherein said at least one additional sensor comprises a 3D angular accelerometer configured to measure the angular acceleration of said mobile electronic system in three dimensions.

9. The apparatus according to claim 8, further comprising said 3D magnetometer, wherein said 3D magnetometer is configured to provide first data indicating a current heading of said mobile electronic system, wherein said 3D angular accelerometer is configured to provide second data indicating a current heading of said mobile electronic system, and wherein said at least one processing component comprises a complementary filter configured to combine said first and said second data indicating a current heading of said mobile electronic system.

10. A mobile electronic system comprising
an output component enabling a presentation of information to a user of said mobile electronic system;
a 3D magnetometer configured to perform magnetic measurements in three dimensions and to provide data indicative of the current posture of said mobile electronic system based on said measurements; and
at least one processing component configured to process said data provided by said 3D magnetometer for enabling a posture related presentation of information via said output component, said processing including selecting one of at least two different modes of presentation depending on said current posture of said system.

11. The mobile electronic system according to claim 10, realizing an inertial navigation system.

12. The mobile electronic system according to claim 10, wherein at least said output component is comprised in a user equipment, wherein at least said 3D magnetometer is comprised in a complementary unit external to said user equipment, wherein said user equipment and said complementary unit comprise a respective connection component rigidly and electrically connecting said complementary unit and said user equipment for providing signals which are based on magnetic measurements of said 3D magnetometer to said user equipment.

13. A complementary unit for a mobile electronic system according to claim 12.

14. A user equipment for a mobile electronic system according to claim 12.

15. A user equipment comprising a mobile electronic system according to claim 10.

16. A method for use in a mobile electronic system, said method comprising:
performing magnetic measurements in three dimensions in said mobile electronic system;
determining data indicative of the current posture of said mobile electronic system based on said performed magnetic measurements; and
processing said data for enabling a posture related presentation of information to a user of said mobile electronic system, said processing comprising selecting one of at least two different modes of presentation depending on said current posture of said system.

17. The method according to claim 16, comprising presenting compass information obtained in said processing.

18. The method according to claim 17, comprising presenting said compass information on a display.

19. The method according to claim 18, comprising presenting a floating compass on a 3D display.

20. The method according to claim 16, further comprising performing additional measurements in said mobile electronic system, wherein said processing is based in addition on measurement data resulting in said additional measurements.

21. The method according to claim 20, wherein said processing comprises using said additional measurement data at least for one of the following: adjusting a presentation of information and filtering signals resulting in said performed magnetic measurements.

22. The method according to claim 20, wherein performing said additional measurements comprises measuring the acceleration of said mobile electronic system in three dimensions.

23. The method according to claim 20, wherein performing said additional measurements comprises measuring the angular acceleration of said mobile electronic system in three dimensions.

24. The method according to claim 23, wherein said processing comprises combining first data indicating a current heading of said mobile electronic system and second data indicating a current heading of said mobile electronic system by a complementary filtering, which first data is based on said magnetic measurements and which second data is based on said angular acceleration measurement.

25. An apparatus comprising
means for receiving data indicative of the current posture of said apparatus and for processing said data for enabling a posture related presentation of information to a user, said processing including selecting one of at least two different modes of presentation depending on said current posture of said; and
means for linking said means for receiving and processing data to means for performing magnetic measurements in three dimensions and for providing said data indicative of the current posture of said apparatus based on said measurements.

* * * * *

UNITED STATES PATENT AND TRADEMARK OFFICE
CERTIFICATE OF CORRECTION

| | | |
|---|---|---|
| PATENT NO. | : 8,401,571 B2 | Page 1 of 1 |
| APPLICATION NO. | : 10/534012 | |
| DATED | : March 19, 2013 | |
| INVENTOR(S) | : Naukkarinen et al. | |

It is certified that error appears in the above-identified patent and that said Letters Patent is hereby corrected as shown below:

In the Specification

In Column 8, Line 32, delete "filter 65." and insert -- filter 69. --, therefor.

In Column 8, Line 35, delete "filter 65" and insert -- filter 69 --, therefor.

In the Claims

In Column 8, Line 51, in Claim 1, delete "comprising" and insert -- comprising: --, therefor.

In Column 9, Line 35, in Claim 10, delete "comprising" and insert -- comprising: --, therefor.

In Column 10, Line 47, in Claim 25, delete "comprising" and insert -- comprising: --, therefor.

Signed and Sealed this
Eleventh Day of March, 2014

Michelle K. Lee
*Deputy Director of the United States Patent and Trademark Office*